(12) United States Patent
Lieberman (10) Patent No.: US 7,898,133 B2
(45) Date of Patent: Mar. 1, 2011

(54) SYSTEM AND METHOD FOR DEVICE SUSPENSION AND WIRELESS POWER TRANSMISSION (76) Inventor: Jeff Lieberman, Cambridge, MA (US)

( * ) Notice: Subject to any disclaimer, the term of this patent is extended or adjusted under 35 U.S.C. 154(b) by 272 days.

(21) Appl. No.: 12/138,293

(22) Filed: Jun. 12, 2008

(65) Prior Publication Data
US 2009/0309440 A1   Dec. 17, 2009

(51) Int. Cl.
H02N 15/00 (2006.01)
(52) U.S. Cl. .................................... 310/90.5
(58) Field of Classification Search ............... 310/90.5; 361/144, 146
See application file for complete search history.

(56) References Cited

U.S. PATENT DOCUMENTS 4,585,282 A * 4/1986 Bosley ...................... 310/90.5

2006/0044094 A1 * 3/2006 Davis et al. ................. 335/220

FOREIGN PATENT DOCUMENTS

JP    05319256 A  * 12/1993

* cited by examiner

Primary Examiner—Quyen Leung
Assistant Examiner—David W. Scheuermann
(74) Attorney, Agent, or Firm—Orrick, Herrigton & Sutcliffe LLP (57) ABSTRACT

A system and method for device suspension and wireless power transmission are disclosed. According to one embodiment, an apparatus, comprises a suspended object having a wireless receiving circuit. A wireless transmission circuit is configured to transmit power to the wireless receiving circuit housed in the suspended object. A magnetic stabilization mechanism is beneath and not in contact with suspended object. A circuit is configured to magnetically control a position of the suspended object.

7 Claims, 12 Drawing Sheets

SYSTEM AND METHOD FOR DEVICE SUSPENSION AND WIRELESS POWER TRANSMISSION

FIELD

The field of the invention relates electronics. In particular, the invention relates to a system and method for device suspension and wireless power transmission.

BACKGROUND

A number of prior magnetic suspension devices demonstrate a floating object with no visible support. Magnetic levitation or suspension can be accomplished in an active system using an electromagnet, position sensor, and feedback control circuit. Levitation or suspension is maintained in the system by increasing the lifting current in the electromagnet when the object falls away from the electromagnet and decreasing the lifting current when the object moves up towards the electromagnet. Although position sensors are used to aid in maintaining levitation or suspension, horizontal stability remains a challenge. Additionally, the distance at which an object can be stably suspended has been limited by the amount of power the electromagnet must output.

Inductive transference of energy or power has been used for many years in the form of transformers in switched mode power supplies. Wireless power has also become a very attractive solution with the proliferation of portable devices in recent years. One popular application has been wireless inductive charging of portable devices, as it may not be safe or convenient for the device to have a physical rather than wireless connection.

SUMMARY

A system and method for device suspension and wireless power transmission are disclosed. According to one embodiment, an apparatus, comprises a suspended object having a viscous fluid and a wireless receiving circuit. A wireless transmission circuit is configured to transmit power to the wireless receiving circuit housed in the suspended object. A magnetic stabilization mechanism is beneath and not in contact with suspended object. A circuit is configured to magnetically control a position of the suspended object.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present embodiments.

DETAILED DESCRIPTION

A system and method for device suspension and wireless power transmission are disclosed. According to one embodiment, an apparatus, comprises a suspended object having a wireless receiving circuit. A wireless transmission circuit is configured to transmit power to the wireless receiving circuit housed in the suspended object. A magnetic stabilization mechanism is beneath and not in contact with suspended object. A circuit is configured to magnetically control a position of the suspended object.

Figure 1:
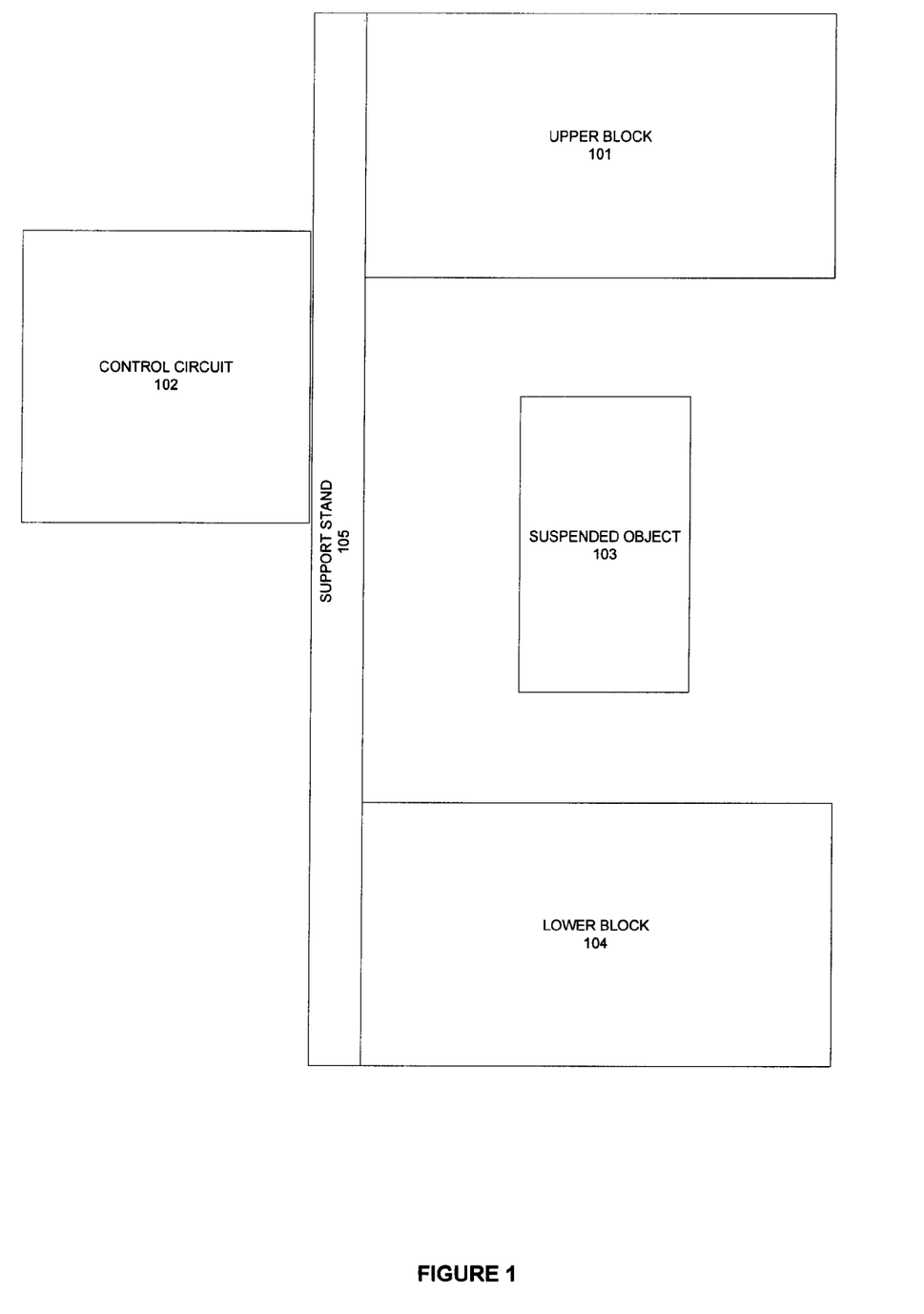
FIG. 1 illustrates a block diagram of exemplary suspended object and wireless power system, according to one embodiment.

FIG. 1 illustrates an exemplary architecture of a system for providing synchronous suspension of an object and wireless power transmission, according to one embodiment. The feedback loop between the upper block 101, lower block 104, and control circuit 102 provide the necessary environment to suspend suspended object 103 while transferring power wirelessly to suspended object 103 (e.g. a light bulb to be powered). Support stand 105 supports and connects the upper block 101, lower block 104, and control circuit 102.

The control circuit 102 controls the strength of the current driving the electromagnet of the upper block 101, while the lower block 104 contains sensing elements to aid in controlling the position of the suspended object 103. Both the suspended object 103 and the lower block 104 contain elements designed to dampen oscillations of the suspended object 103.

Figure 2A:
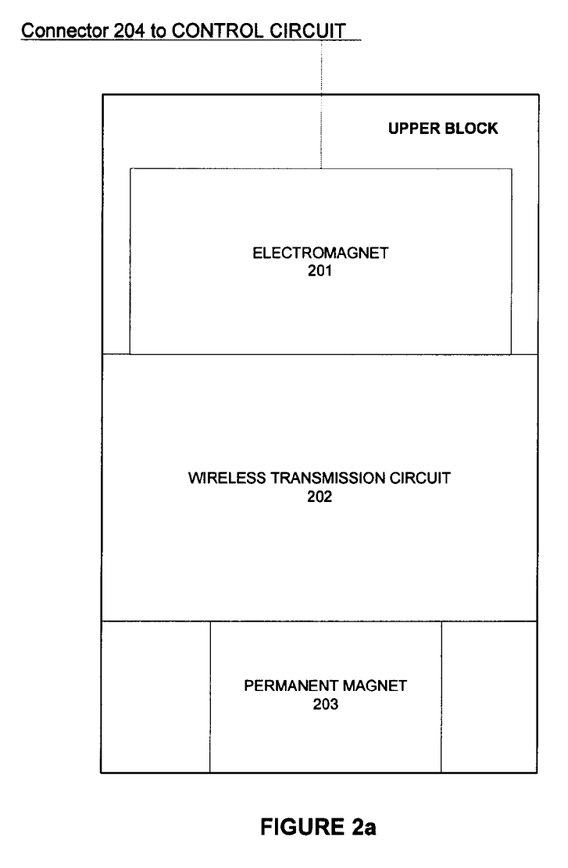
FIG. 2a illustrates a block diagram of an exemplary upper control block, according to one embodiment.

FIG. 2a illustrates exemplary elements contained within the upper block 101. Suspension is controlled by an electromagnet 201 in parallel with permanent magnet 203 (in this example, a DC offset magnet) along with additional control circuitry connected via connection 204. The permanent magnet 203 (in this example, a DC offset magnet) in parallel with electromagnet 201 allows for suspension at a large distance as compared to typical suspension systems, at a far lower electrical power than would otherwise be needed. The strength of the permanent magnet 203 is chosen to exactly balance the suspended object 103 using magnetic attraction, based on the desired distance and weight of the suspended object 103; or the distance is chosen based on the already specified permanent magnet 203 strength. Then the electromagnet 201 provides the stabilization force as the suspended object 103 deviates from the desired position.

A wireless transmission circuit 202 transmits connectionless power to a receiving circuit (described later) contained within the suspended object 103.

Figure 2B:
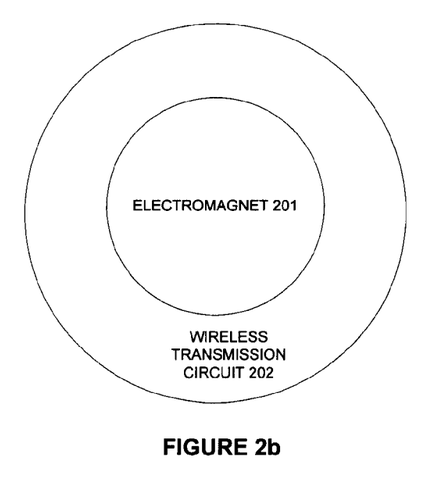
FIG. 2b illustrates a top level view of the exemplary upper control block of FIG. 2a, according to one embodiment.

FIG. 2b illustrates a top level view of the exemplary upper control block of FIG. 2a, according to one embodiment. The wireless transmission circuit 202 forms a ring around the electromagnet 201, making them coaxial.

Figure 3A:
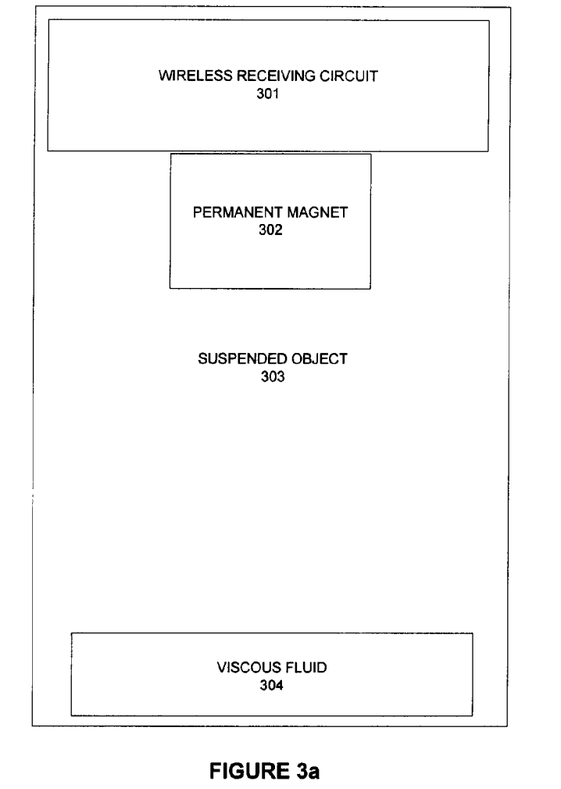
FIG. 3a illustrates a block diagram of an exemplary suspended object, according to one embodiment.

In FIG. 3a a suspended object 303 contains a permanent magnet 302 necessary for suspension. It also contains a viscous fluid 304 for damping of oscillations. Any oscillations cause the viscous fluid 304 to move, generating a small amount of heat that dissipates into energy and lessens the oscillations. A wireless receiving circuit 301 receives power transmitted from wireless transmission circuit 202.

Figure 3B:
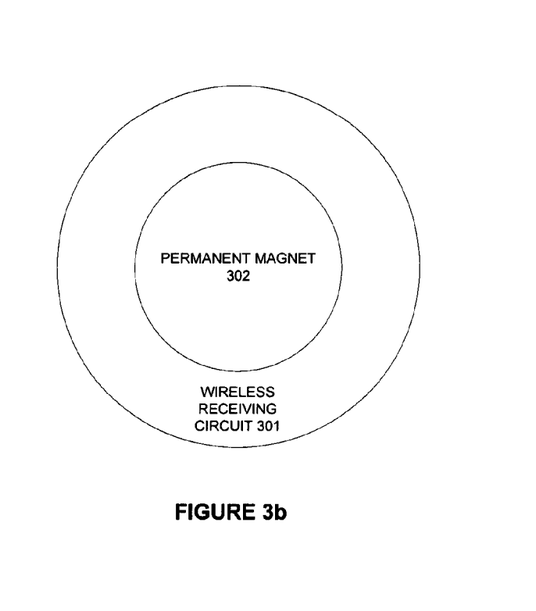
FIG. 3b illustrates a top level view of the exemplary suspended object of FIG. 3a, according to one embodiment.

FIG. 3b illustrates a top level view of the elements in FIG. 3a. A wireless receiving circuit 301 forms a ring around a permanent magnet 302, making them coaxial.

Figure 4:
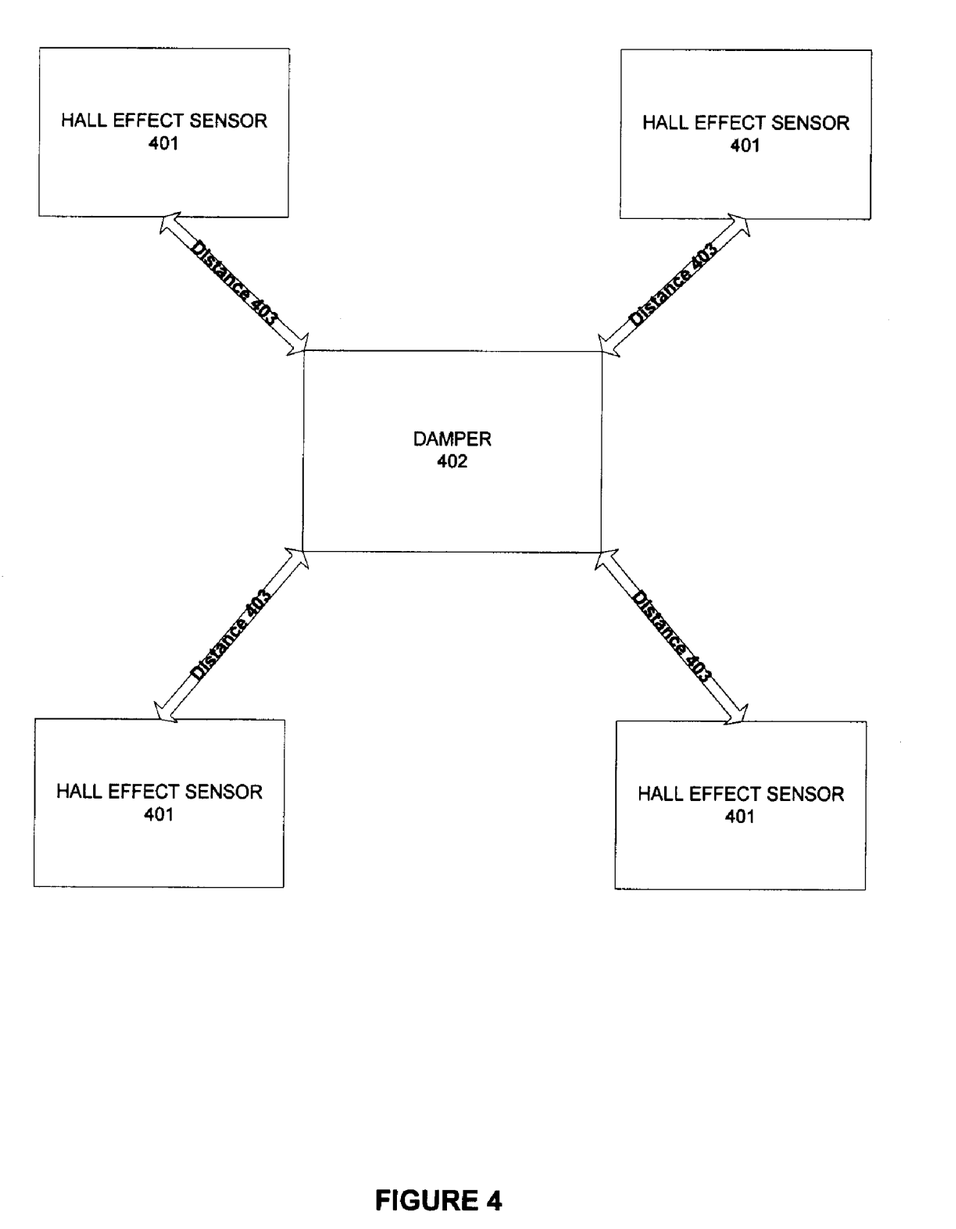
FIG. 4 illustrates a top level view block diagram of an exemplary lower control block, according to one embodiment.

FIG. 4 illustrates a top level view of the exemplary lower block 104, according to one embodiment. A damper 402 is placed in the center of (distance 403 away from) an array of hall effect sensors 401 (here 4 are shown, although a radially symmetric array is acceptable from 3 sensors onwards). The damper 402 is aligned so that it slightly attracts the above suspended object 103. As horizontal stabilization is difficult to control with a single electromagnet (which balances the vertical position), this slight attraction further attempts to hold the suspended object 103 in place, by making it more difficult for the bottom of the object to oscillate horizontally. The values of the hall effect sensors 401 are averaged to yield a position measurement on the suspended object. The hall effect sensors 401 are chosen as non-optical so that a user can place hands and objects nearby and not have any effect on object suspension.

Figure 5:
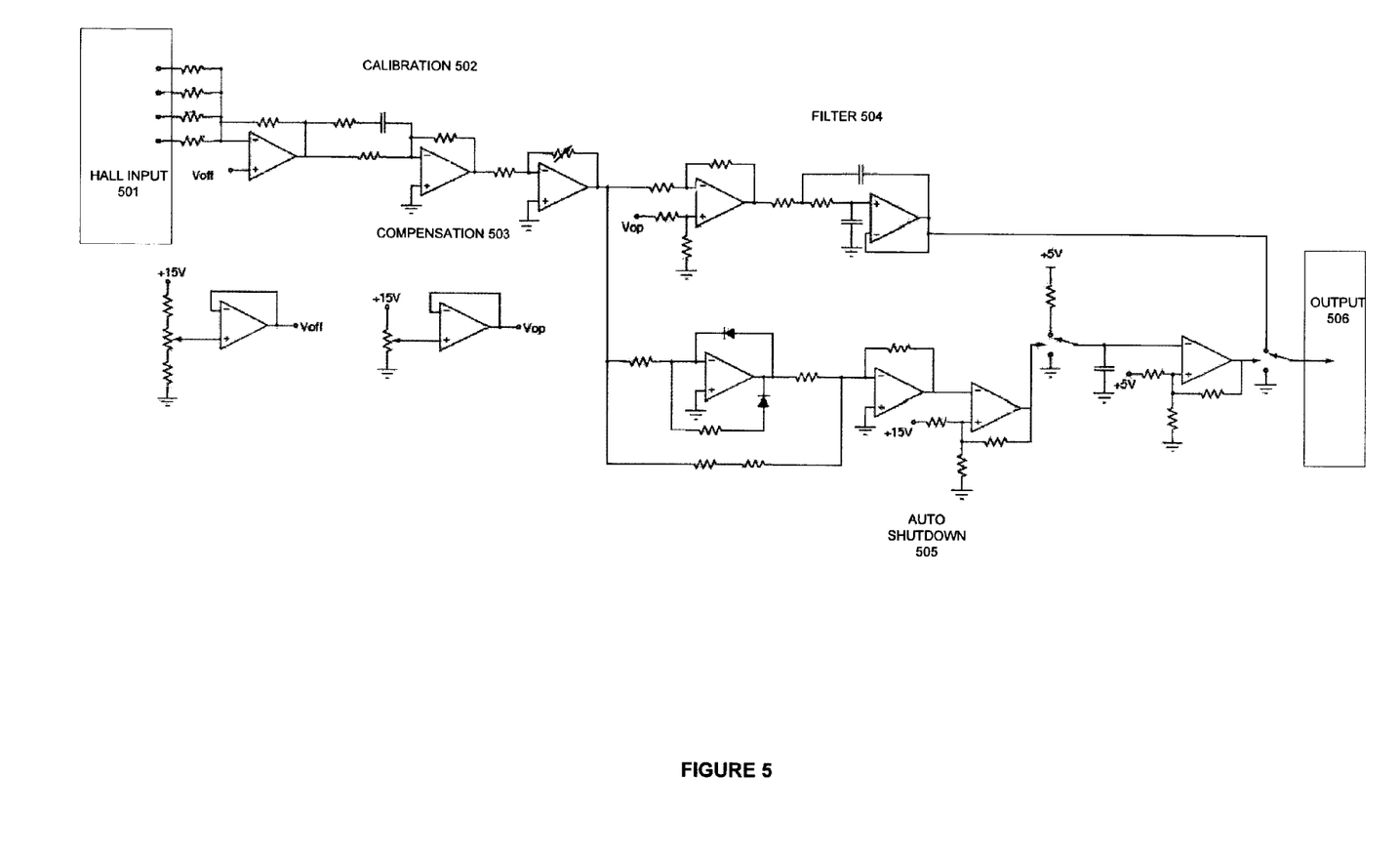
FIG. 5 illustrates an exemplary suspension control circuit, according to one embodiment.

FIG. 5 illustrates the control circuitry necessary for suspension feedback loop of the preferred embodiment. As magnetic suspension is a non-linear and highly unstable system, a control system such as a PD (or PID, or more elaborate in other embodiments) control system is employed, where the position and velocity of the object are both combined to yield a control signal.

In the example circuit, hall effect sensors 401 register a magnetic field providing hall input 501 to the control circuit. As the suspended object 103 moves closer to the sensors 401, the analog reading increases. In this example the readings from the sensors are averaged, and delivered to a calibration block 502. For a proper feedback control system to enable suspension, the sensor readings (hall input 501) need to be shifted and amplified. As the position of the suspended object 103 and the strength of the magnets involved change from instantiation to instantiation, the calibration block 502 must calibrate the inputs to create the correct input for the feedback system. The calibrated signals are then delivered to a compensation block 503. The compensation block 503 generates an error signal based on comparing the current sensor input 501 to desired sensor readings, and can change response based on static error and the dynamics of the system. In order to reduce noise, driving signals from the compensation block 503 that do not effect the suspension system are filtered out using a filter block 504. This reduces the high frequency drive signal on the electromagnet and thus reduces heat in the system, and cleans the output signal 506. The output signal 506 is then sent through an amplification stage (analog or digital), and drives the electromagnet 201 directly. Changes in output to the electromagnet 201 affect both the strength and direction of the current in the electromagnet 201. This causes active pushing and pulling on the suspended object 103. This can allow control to a minimum-power position, or alternatively can control the suspended object 103 to raise or lower from its minimal position, to animate through space. Should the suspended object 103 fall out of a specified range, or be manually removed, an auto shutdown block 505 turns power off to the system automatically.

Figure 6:
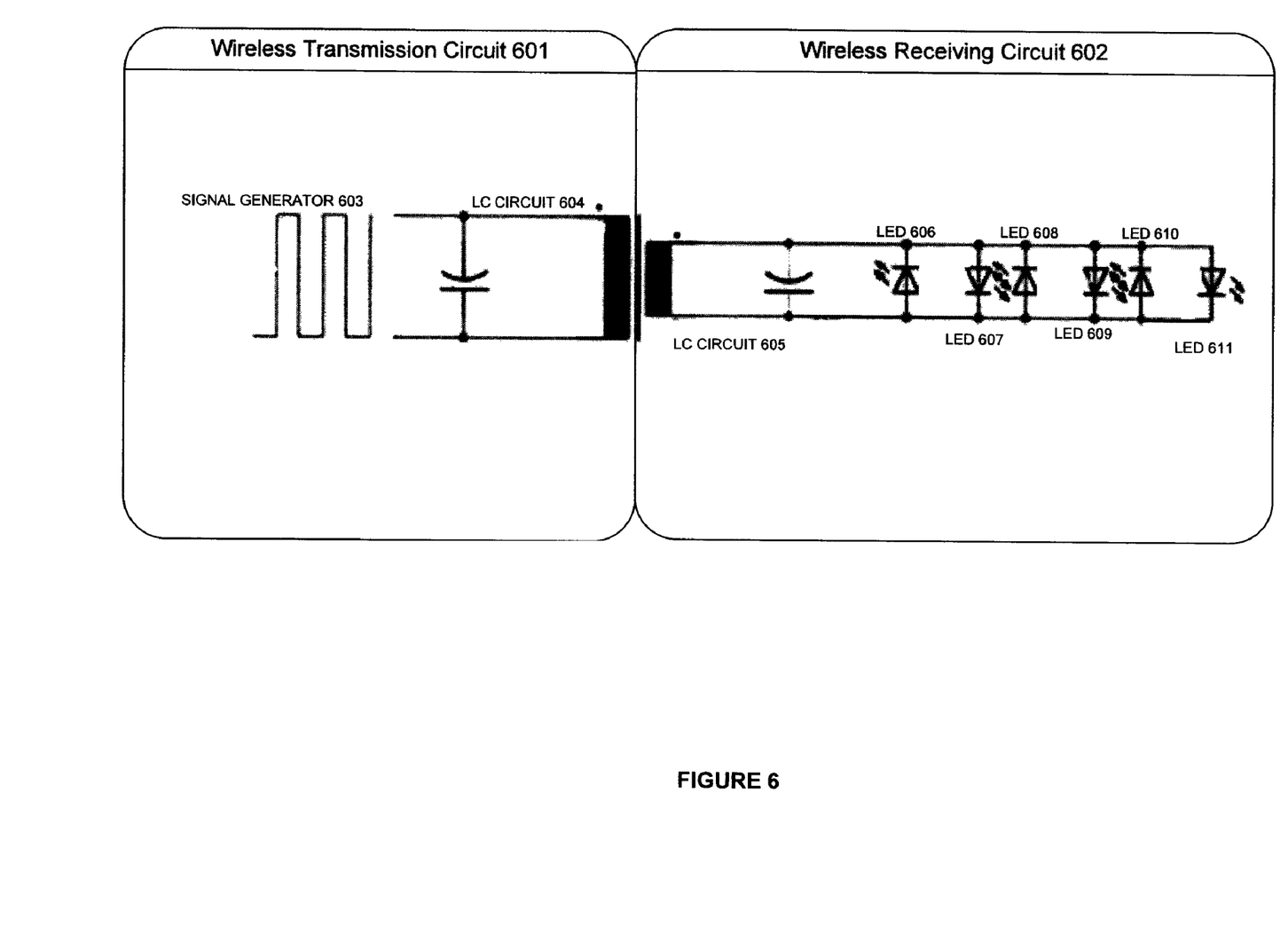
FIG. 6 illustrates transmission and receiving circuits of an exemplary wireless power system, according to one embodiment.

FIG. 6 illustrates exemplary wireless transmission circuit (transmitter) 601 and wireless receiving circuit (receiver) 602, according to one embodiment. The wireless circuit uses resonance to greatly increase the efficiency of transferred energy from transmitter 601 to receiver 602, in a resonant inductive transfer circuit. A mid-range frequency [for example 30 kHz] alternating current is created in the LC circuit 604 within the transmitter 601, and the receiver 602 contains an LC circuit 605 tuned to receive energy specifically at that frequency. Both the transmitter 601 and receiver 602 are resonant to the same frequency. A secondary voltage is induced due to current in the primary (transmitter 601) coil within LC circuit 604. The resonant frequencies are highly dependent on the permanent magnets or metals used in LC circuit 604 and LC circuit 605, as they greatly effect the inductance of both elements, and therefore the operating frequency. The received AC energy is rectified when it is received by wireless receiving circuit 602. In the example circuit, the LEDs (606-611) directly rectify the signal, as they function not only as the rectification element, but also the load. The rectifying elements (LEDs 606-611) pump energy into a storage element such as a capacitor, that is held in parallel to the load element. The magnets involved in LC circuits 604 and 605 greatly change the inductance of the circuits, and the resonance frequency is largely dependent on the inductance and capacitance values. Therefore, the capacitance values must be chosen so that, along with the inductances of the LC circuits 604 and 605 assemblies, they produce the desired (and same, between transmitter 601 and receiver 602) frequency.

Figure 7:
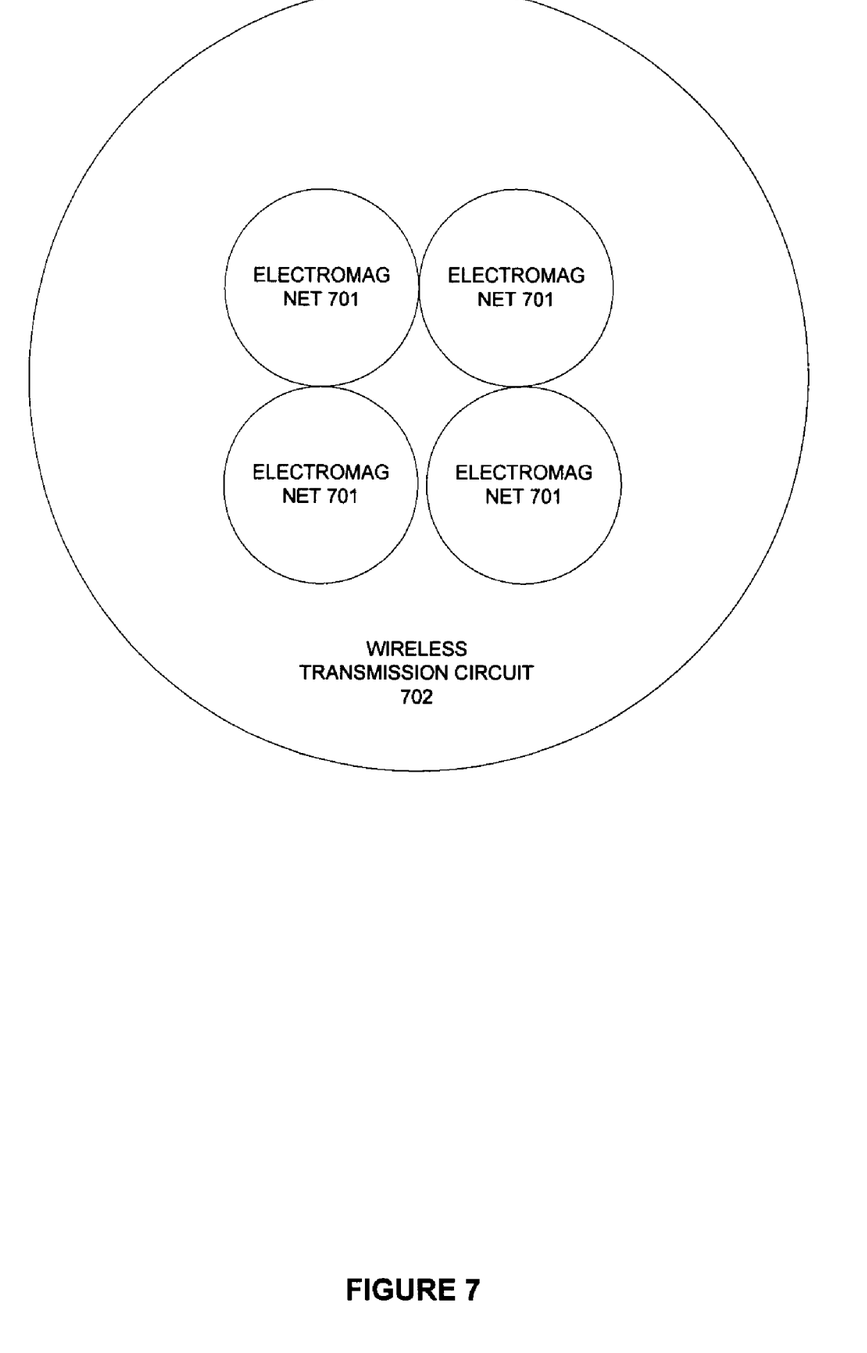
FIG. 7 illustrates a top level view of the exemplary upper control block, according to yet another embodiment.

FIG. 7 illustrates a top level view of an exemplary upper control block, according to yet another embodiment. Electromagnets 701 are arranged as a radially symmetric array, while a wireless transmission circuit 702 is placed around them in a ring. The array of electromagnets 701 can average a z-axis 'lifting' signal, while each imparting their own slight off-axis signal, to stabilize horizontal motions of the suspended object.

Figure 8:
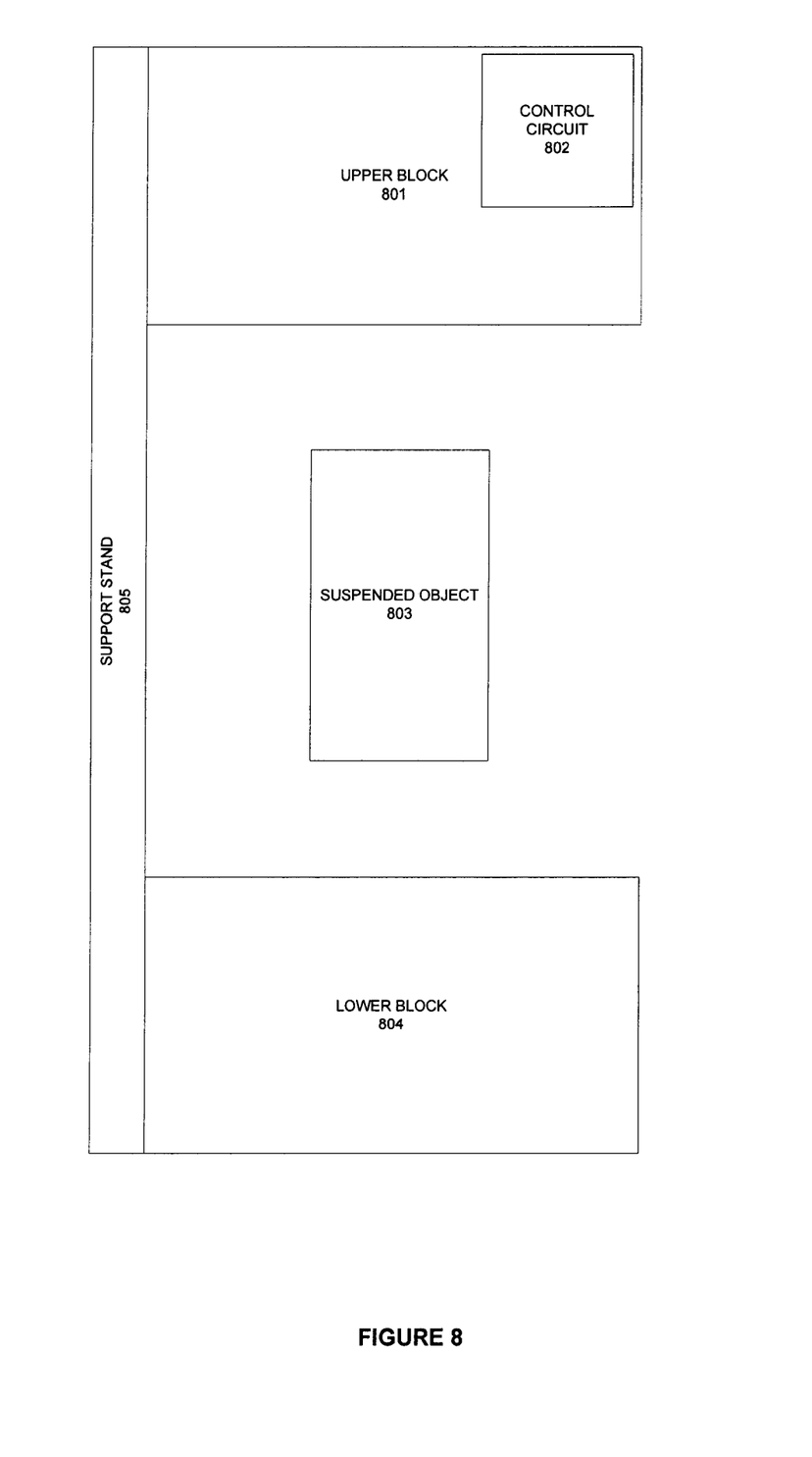
FIG. 8 illustrates a block diagram of exemplary suspended object and wireless power system, according to another embodiment.

FIG. 8 illustrates a block diagram of exemplary suspended object and wireless power system, according to another embodiment. In this embodiment a control circuit 802 is included within an upper control block 801, rather than as a separate block as in FIG. 1.

Figure 9:
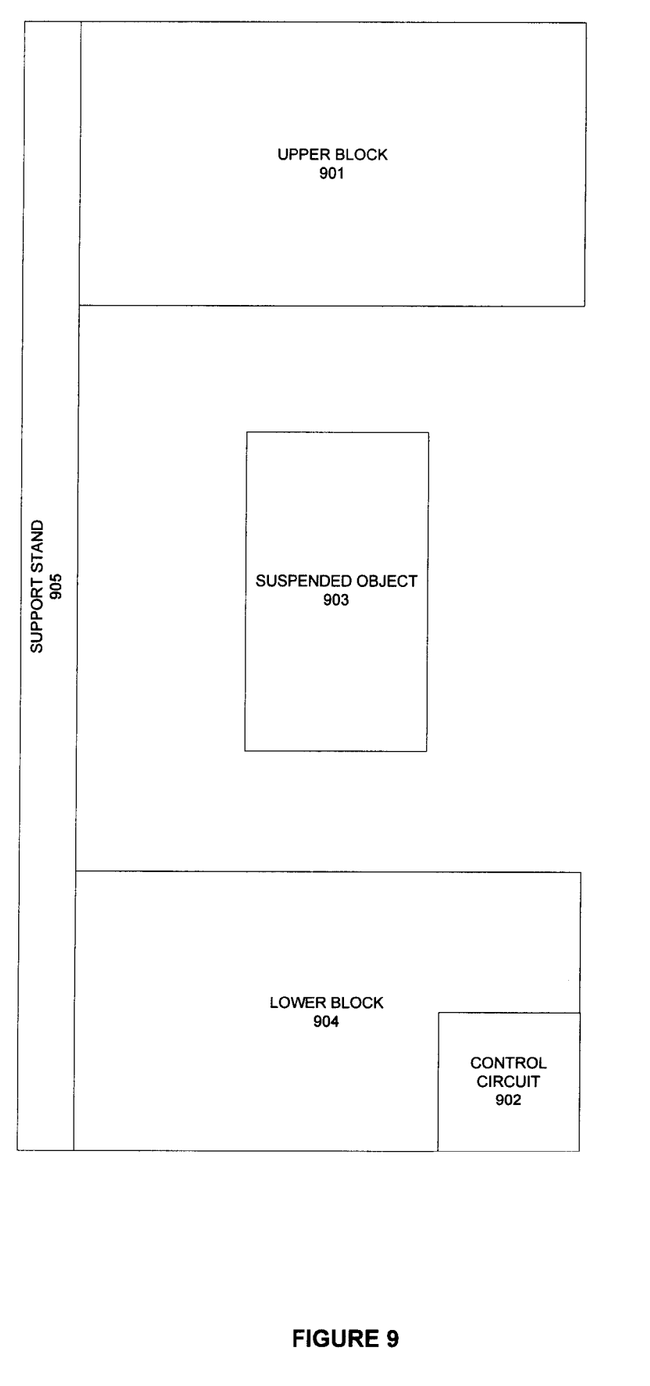
FIG. 9 illustrates a block diagram of exemplary suspended object and wireless power system, according to yet another embodiment.

FIG. 9 illustrates a block diagram of exemplary suspended object and wireless power system, according to another embodiment. In this embodiment a control circuit 902 is included within a lower control block 904, rather than as a separate block as in FIG. 1.

Figure 10A:
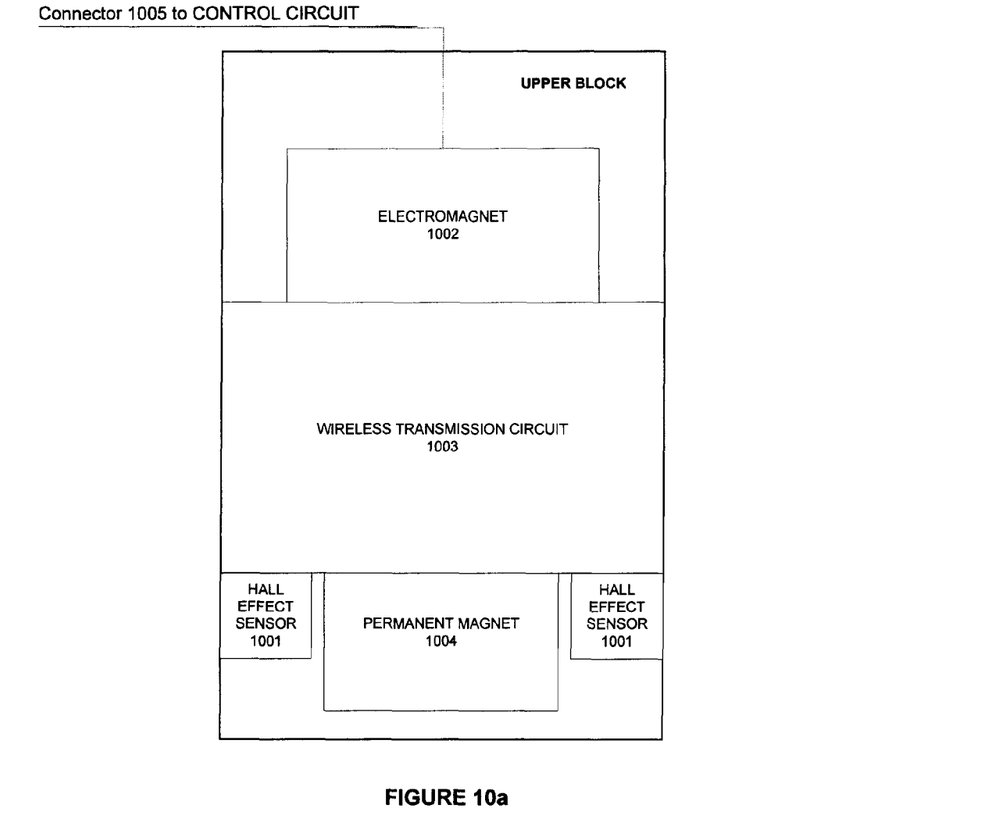
FIG. 10a illustrates a block diagram of an exemplary upper control block, according to another embodiment.

FIG. 10a illustrates a block diagram of an exemplary upper control block, according to another embodiment. Suspension is controlled by an electromagnet 1002 in parallel with permanent magnet 1004 along with additional control circuitry connected via connection 1005. The permanent magnet 1004 in parallel with electromagnet 1002 allows for suspension at a far distance as compared to typical suspension systems, at a far lower electrical power than would otherwise be needed. A wireless transmission circuit 1003 transmits connectionless power to a receiving circuit contained within the suspended object. Hall effect sensors 1001 are positioned around the permanent magnet 1004.

Figure 10B:
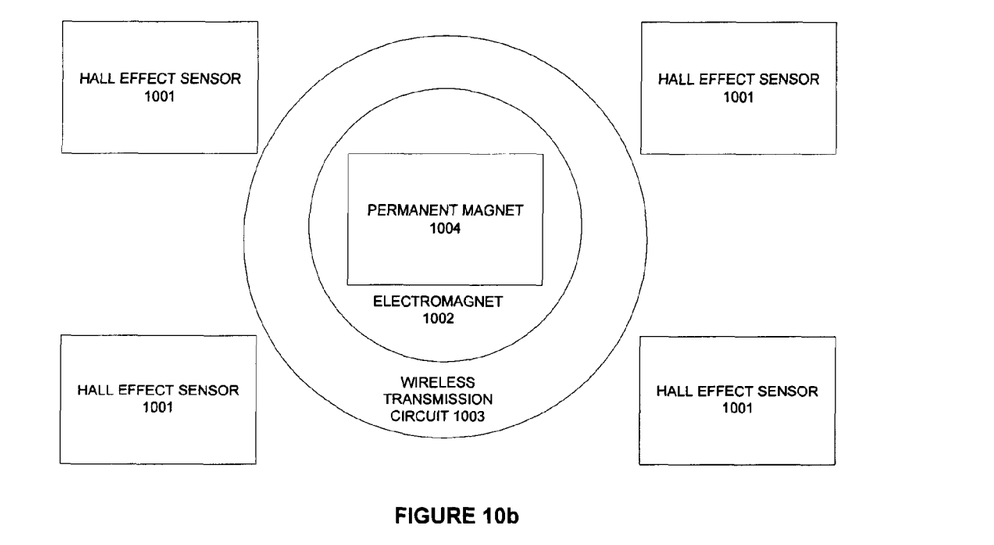
FIG. 10b illustrates a bottom level view of the exemplary upper control block of FIG. 10a, according to another embodiment.

FIG. 10*b* illustrates a bottom level view of an exemplary upper control block of FIG. 10*a*, according to another embodiment. The wireless transmission circuit 1003 forms a ring around the electromagnet 1002, making them coaxial. A permanent magnet 1004 is connected to the bottom of electromagnet 1002, and hall effect sensors 1001 are placed around the permanent magnet 1004.

Figure 11:
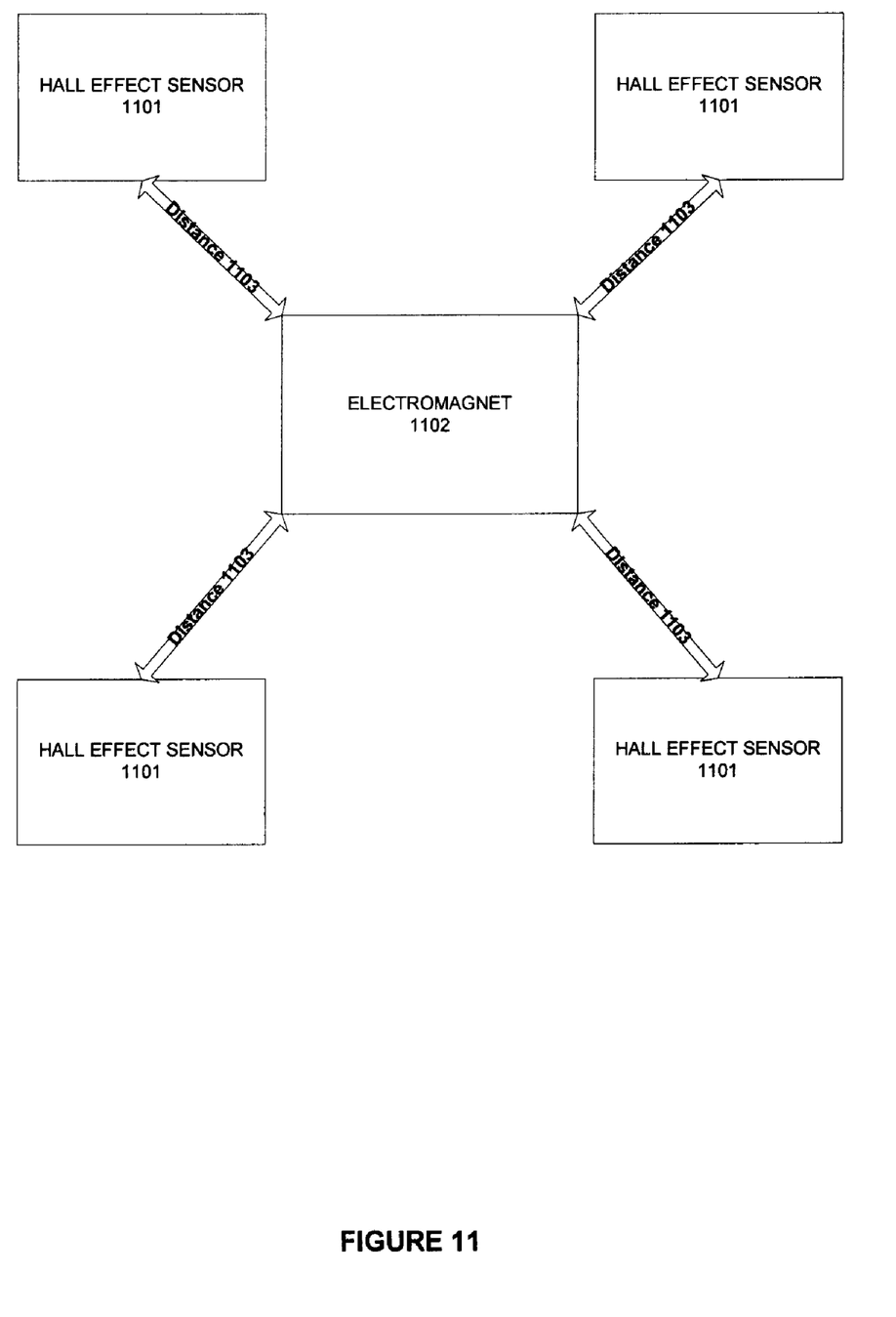
FIG. 11 illustrates a top level view block diagram of an exemplary lower control block, according to another embodiment.

FIG. 11 illustrates a top level view of the exemplary lower block 104, according to one embodiment. An electromagnet 1102 is placed in the center of (distance 1103 away from) an array of hall effect sensors 1101 (here 4 are shown, although a radially symmetric array is acceptable from 3 sensors onwards). The electromagnet 1102 is aligned so that it slightly attracts the above suspended object 103. As horizontal stabilization is difficult to control with a single electromagnet (which balances the vertical position), this slight attraction further attempts to hold the suspended object 103 in place, by making it more difficult for the bottom of the object to oscillate horizontally. Here the values of the hall effect sensors 1101 will be differenced to yield a horizontal position measurement on the suspended object 103. The hall effect sensors 1101 are chosen as non-optical so that a user can place hands and objects nearby and not have any effect on object suspension.

Figure 12:
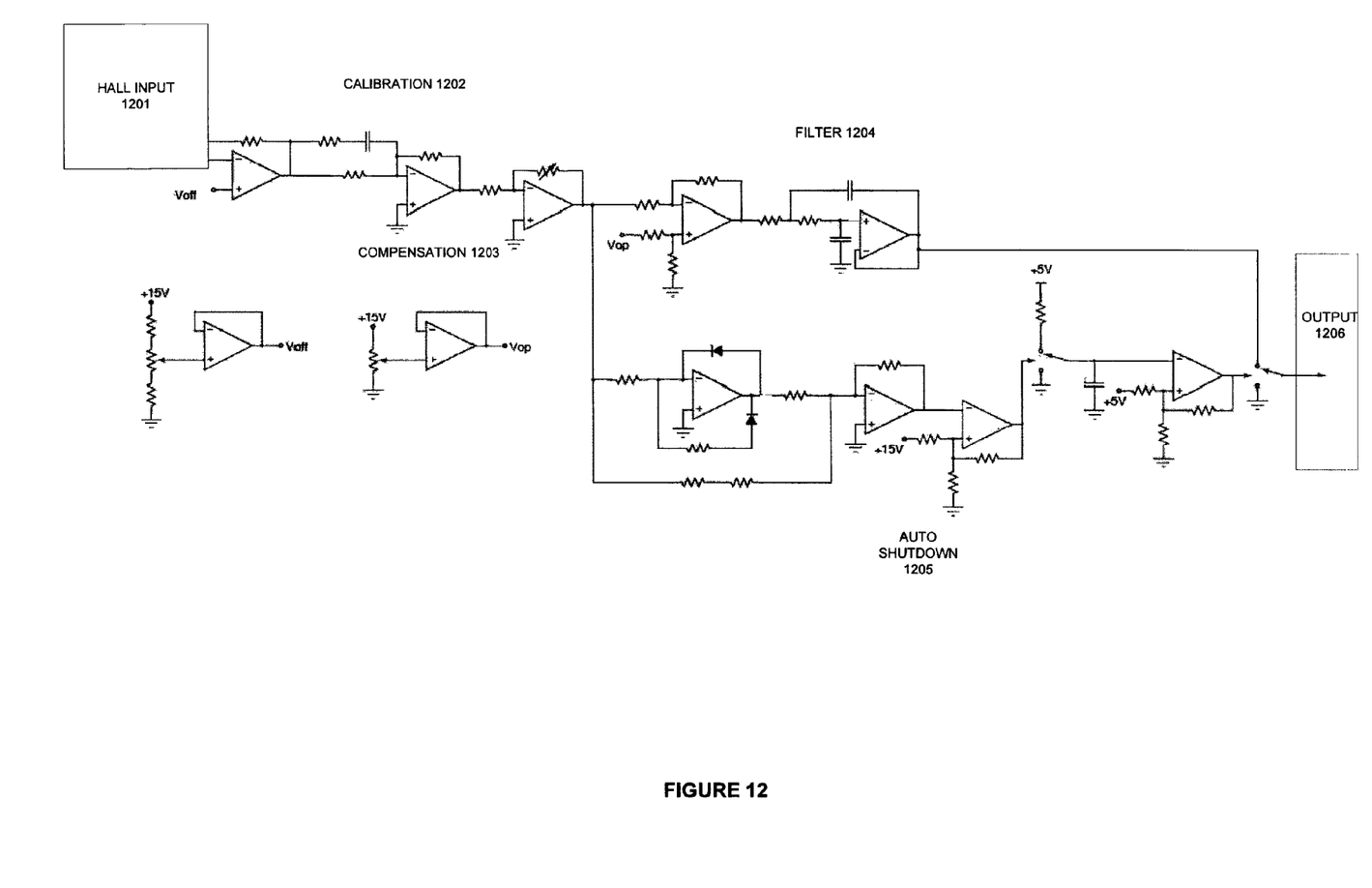
FIG. 12 illustrates an exemplary suspension control circuit for driving the electromagnet in FIG. 11, according to one embodiment.

FIG. 12 illustrates an exemplary suspension control circuit for driving the electromagnet in FIG. 11, according to one embodiment. In the example circuit, hall effect sensors 1101 register a magnetic field providing hall input 1201 to the control circuit. In this example the readings from the sensors are differenced (any differences indicate horizontal motion), and delivered to a calibration block 1202. For a proper feedback control system to enable suspension, the sensor readings (hall input 1201) need to be shifted and amplified. The calibration block 1202 calibrates the inputs to create the correct input for the feedback system. The calibrated signals are then delivered to a compensation block 1203. The compensation block 1203 generates an error signal based on comparing the current sensor input 1201 to desired sensor readings, and can change response based on static error and the dynamics of the system. In order to reduce noise, driving signals from the compensation block 1203 that do not effect the suspension system are filtered out using a filter block 1204. This reduces the high frequency drive signal on the electromagnet 1102 and thus reduces heat in the system, and cleans the output signal 1206. The output signal 1206 is then sent through an amplification stage (analog or digital), and drives the electromagnet 1101 directly. Should the suspended object 103 move out of a specified range, or be manually removed, an auto shutdown block 1205 turns power off to the system automatically.

I claim:

1. An apparatus, comprising
    a suspended object having a wireless receiving circuit;
    a wireless transmission circuit configured to transmit energy to the wireless receiving circuit housed in the suspended object, wherein the energy is rectified by a plurality of LEDs and stored in a capacitor, and wherein the energy is used to electrically power the suspended object;
    magnetic stabilization mechanisms beneath and not in contact with suspended object; and
    a circuit configured to magnetically control a position of the suspended object.

2. The apparatus of claim 1, wherein the circuit to control position comprises:
    Hall effect sensors arranged in a radially symmetric array;
    an electromagnet that receives amplified current as an output of the circuit; and
    a permanent DC offset magnet in parallel with the electromagnet.

3. The apparatus of claim 2, further comprising a control circuit to control current output to the electromagnet.

4. The apparatus of claim 1, wherein the suspended object further comprises a permanent magnet arranged in a center of the wireless receiving circuit.

5. The apparatus of claim 1, wherein the wireless transmission circuit comprises:
    a signal generator; and
    an LC circuit.

6. The apparatus of claim 1, wherein the wireless receiving circuit comprises:
    a plurality of LEDs; and
    an LC circuit.

7. The apparatus of claim 1, wherein the suspended object further comprises a viscous fluid arranged at the bottom of the object.

* * * * *